United States Patent
Giannopoulos et al.

(10) Patent No.: US 7,123,159 B2
(45) Date of Patent: Oct. 17, 2006

(54) POSITION DEPENDENT INFORMATION RETRIEVAL SYSTEM

(75) Inventors: Demetri Giannopoulos, Norwalk, CT (US); Ihor Terence Wacyk, Briarcliff Manor, NY (US)

(73) Assignee: Koninklijke Philips Electronics N. V., Eindhoven (NL)

( * ) Notice: Subject to any disclaimer, the term of this patent is extended or adjusted under 35 U.S.C. 154(b) by 476 days.

(21) Appl. No.: 10/192,095

(22) Filed: Jul. 10, 2002

(65) Prior Publication Data

US 2004/0008121 A1    Jan. 15, 2004

Related U.S. Application Data

(63) Continuation of application No. 10/029,805, filed on Dec. 27, 2001, now Pat. No. 6,807,478.

(51) Int. Cl.
 *G08B 5/22* (2006.01)
(52) U.S. Cl. ............... 340/815.45; 340/815.47; 701/207
(58) Field of Classification Search ............ 340/815.4, 340/815.43, 815.44, 815.45, 815.47, 815.65, 340/815.69; 398/129, 152, 185; 315/318; 369/47.19; 345/82; 702/200, 207
See application file for complete search history.

(56) References Cited

U.S. PATENT DOCUMENTS

| | | | |
|---|---|---|---|
| 5,416,535 A | 5/1995 | Sato et al. | 348/706 |
| 5,416,627 A * | 5/1995 | Wilmoth | 398/129 |
| 5,926,301 A * | 7/1999 | Hirt | 398/185 |
| 6,437,892 B1 * | 8/2002 | Fang et al. | 398/152 |
| 6,445,369 B1 * | 9/2002 | Yang et al. | 345/82 |
| 6,548,967 B1 * | 4/2003 | Dowling et al. | 315/318 |
| 6,687,206 B1 * | 2/2004 | Masui | 369/47.19 |
| 6,807,478 B1 * | 10/2004 | Giannopoulos et al. | 701/207 |

FOREIGN PATENT DOCUMENTS

EP    0744839 A2    11/1996

* cited by examiner

*Primary Examiner*—Van T. Trieu

(57) ABSTRACT

A position dependent information retrieval system is disclosed including a light source having a driver and an encoder. The driver and the encoder are coupled to the light source so that the light source produces a modulated light signal in accordance with a predetermined signature. The system also includes a receiver having a photosensitive detector capable of detecting the modulated light signal and a decoder capable of decoding the predetermined signature. A controller is communicatively coupled to the receiver, a memory and output device. The controller is arranged to receive the decoded predetermined signature, based upon the decoded predetermined signature, obtain at least one localized message in the memory, and output the localized message using the output device.

17 Claims, 4 Drawing Sheets

POSITION DEPENDENT INFORMATION RETRIEVAL SYSTEM

CROSS-REFERENCE TO RELATED APPLICATIONS

This is a continuation of U.S. patent application Ser. No. 10/029,805, filed Dec. 27, 2001, now U.S. Pat. No. 6,807,478.

FIELD OF THE INVENTION

The present invention pertains generally to the field of information retrieval systems, and in particular, the invention relates to an information system used to provide localized messages dependent upon the position inside a building, structure or location using, in part, existing artificial light sources.

BACKGROUND OF THE INVENTION

There are numerous instances where it is necessary to transmit a message of a localized nature to someone, and which needs to be updated on a regular but not instantaneous basis. Examples of such instances include promotions offered by a nearby store or mall, commentaries on pieces of art in a museum, or the nature, cost and location of sale items in a supermarket. Currently, information of a localized nature can be communicated in a number of ways. Foremost are signs with pictograms or reading material. However, signs require visual attention, which may distract the person the message is directed to. Signs may also be difficult to find in a visually cluttered environment. Another method is a sound broadcast. However, sound broadcasts by their nature are directed at everyone within a particular space. A sound broadcast also must be repeated over and over again, consequently requiring such broadcasts be kept relatively short. Sound broadcasts are typically used only for warnings or guided visits.

Another method is a device receiving the message in a wireless fashion, such as via infrared or radio frequency. The devices reconstruct the message in text or auditory format. This method requires an intelligent network of localized transmitters and can be costly to install and maintain. Infrared and radio frequency communications face other limitations as well. Infrared is strongly directional and positioning within the room is very important. Radio frequency (RF) is sensitive to interference from emitters in other locations or other RF devices. Compliance with the many RF regulations around the world creates additional costs for RF systems.

Another method is a portable device carried by a user which stores a number of messages in memory. For example, systems based on messages prerecorded on a tape player have been in use in museums for some years. They are advantageous because they provide a personalized experience for the user and are relatively simple and inexpensive to install and maintain since no networks are involved. However, they face a number of drawbacks. The user must specify his location to receive the relevant message, and he must visit the exhibits in a predetermined sequence since the messages are not randomly accessible. The action required from the user reduces the effectiveness of this method. Also the messages can not be readily altered. This system could be improved if the message corresponding to the user's location were automatically determined. Various approaches have been proposed to achieve this objective, such as ultrasonic or radio transmitters which function as location beacons. However, they suffer from interference and cost problems.

Accordingly, there is a need for a position dependent information retrieval system that solves the shortcomings of the above described systems.

BRIEF SUMMARY OF THE INVENTION

One aspect of the present invention uses the existing lighting infrastructure (e.g., fluorescent lamps and fluorescent lamp drivers) in a building or structure to form a position dependent information retrieval system. Light intensity can be modulated to carry a message. The modulation can be performed at a high frequency such that its effect on the light intensity as perceived by humans is null. Light sources are ideal since by their nature they are localized to a room and less susceptible to interference. This arrangement typically does not require any additional infrastructure cost. The lighting infrastructure may be any type of light source (e.g., fluorescent, halogen or incandescent light sources). The building or structure can be any type of house, office, arena, complex or location that include some sort of artificial lighting.

Thus the artificial light in a room can be used to transmit a coded message that is unique at each position within the building and that can be detected by a portable device. The unique code for each light source can be fixed at the factory and can remain fixed for the life of the product. The existing lighting infrastructure within the building, in addition to providing illumination as its primary function, can be used to create a constellation of such light beacons. Each light beacon would not need to receive input data and consequently would not need to be tied to a network. This would keep the cost of implementation and operation very low.

A small portable device could be used to deliver localized messages which are automatically retrieved from internal memory, and which would correlate to various locations. The devices could either display the message on a small screen, such as those on a personal digital assistant (PDA), or be synthesized to speech and delivered to the user through headsets. This frees the user from the distraction of manually having to enter her location. In addition, the messages can be retrieved in any order so the user is free to choose any random route to follow through the building. The messages would also be easily updated on a regular basis by passing the receiver near a transmitter located at a central location, such as the entrance to a building. An input for user preferences and interests can also be provided (e.g. a keypad), so that a user specific profile can be stored in memory to further filter messages associated with particular locations.

Various embodiments of the invention can be used to add a position dependent information retrieval system within a building. Application examples of this invention include:

Receiving commentaries while walking though a museum;

Receiving promotions offered in supermarkets;

One embodiment of the present invention is directed to a position dependent information retrieval system used inside a building, structure, arena or location. Light sources are used as beacons to transmit unique codes by modulating their light output. The transmitted codes are decoded by an optical receiver and are used in combination with a table of associations stored in the receiver to provide position dependent information to the user within a building (e.g., mall, museum or airport).

In one embodiment, an information system includes a light source having a driver and an encoder. The driver and the encoder are coupled to the light source so that the light source produces a modulated light signal in accordance with a predetermined signature. A receiver is provided having a photosensitive detector capable of detecting the modulated light signal and a decoder capable of decoding the predetermined signature. A controller is communicatively coupled to the receiver, a memory and an output device. The controller is arranged to receive the decoded predetermined signature. Based upon the decoded predetermined signature, the controller obtains at least some information stored in the memory and outputs the information using the output device.

In another embodiment, an optical receiver is provided for operation with the information retrieval system.

Yet another embodiment is directed to an information retrieval system including means for producing a light signal having a signature, means for decoding the signature from the light signal and means for providing a localized message in accordance with the signature.

These and other embodiments and aspects of the present invention are exemplified in the following detailed disclosure.

BRIEF DESCRIPTION OF DRAWINGS

The features and advantages of the present invention can be understood by reference to the detailed description of the preferred embodiments set forth below taken with the drawings, in which.

DESCRIPTION OF EMBODIMENTS

Figure 1:
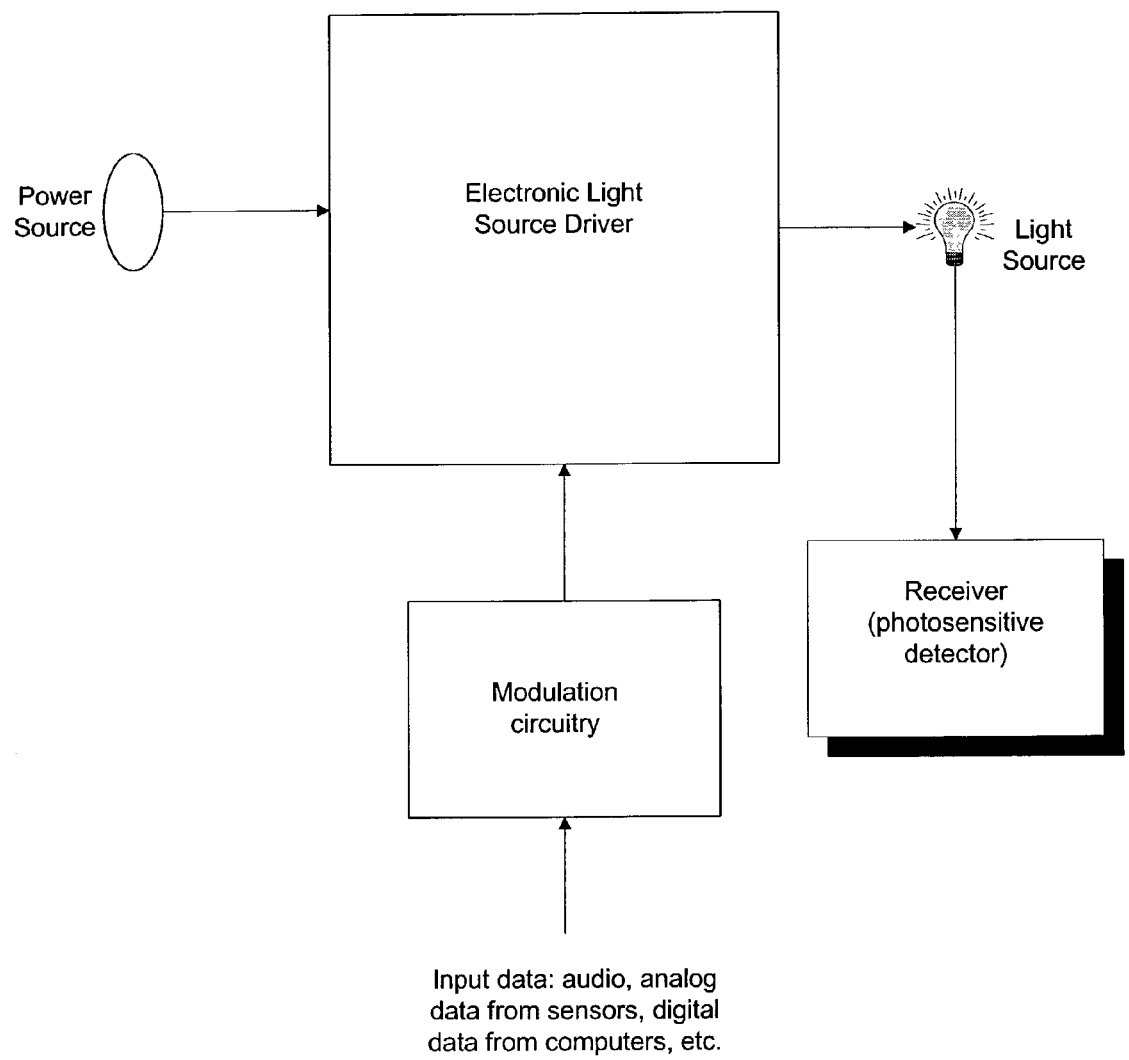
FIG. 1 is a conventional lighting system with data transmission capability.
Figure 2:
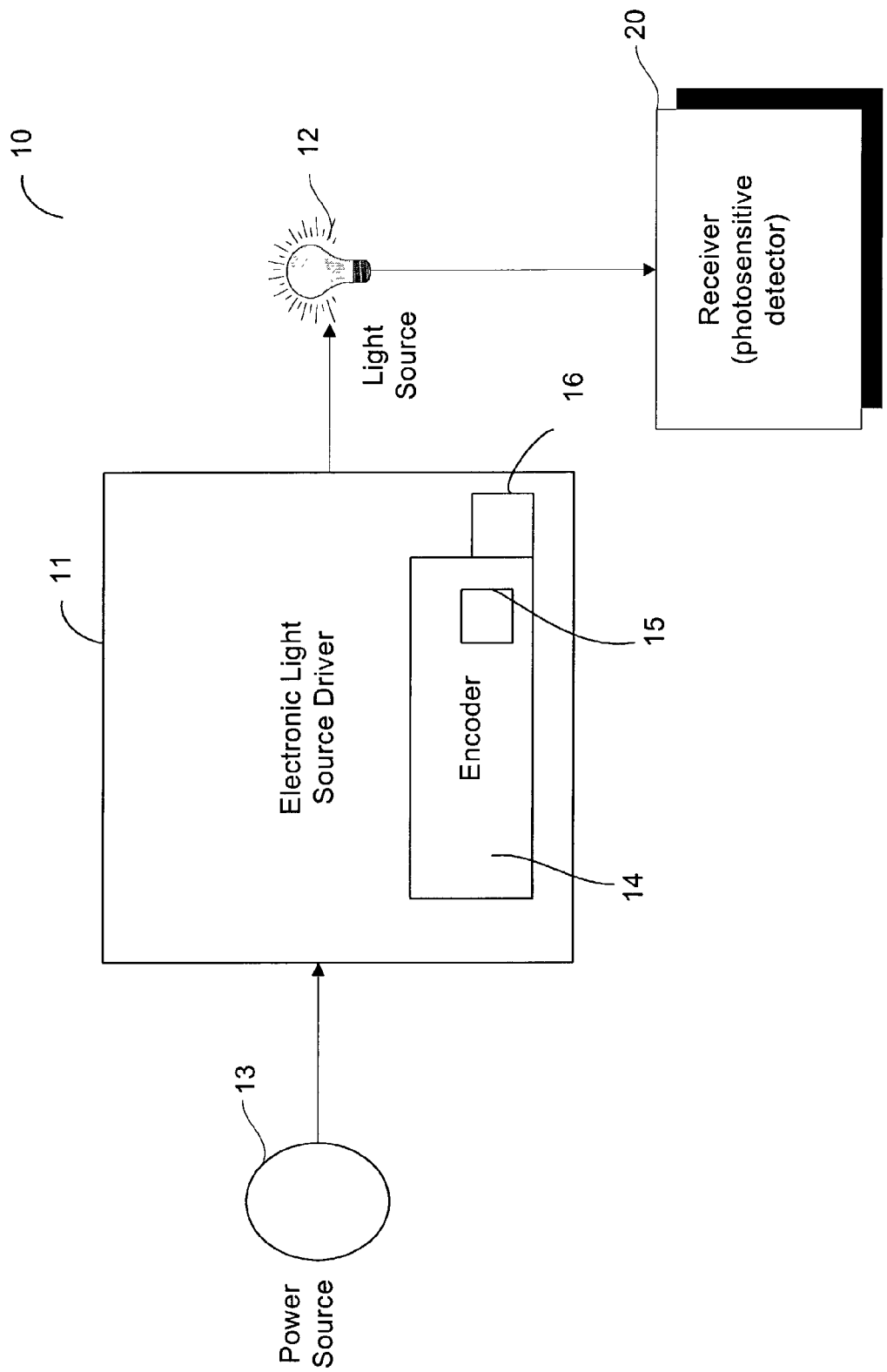
FIG. 2 is a light encoding system in accordance with one aspect of the invention.

Referring now to FIG. 2, a information system 10 is shown, which includes a driver 11, a light source 12 and a power source 13. The driver 11 includes an encoder 14 for encoding a unique code 15 which is transmitted by modulating light emitted from the light source 12. In this way, the light is modulated to have a signature in accordance with the unique code 15. The light source 12 and the driver 11 may be supplied (from a manufacturer) with the unique code 15. The unique code 15 may also be programmable via an interface 16. The interface may be a data input port or a wireless data interface (e.g., infrared or radio-frequency (RF)).

A plurality of light encoding systems 10 each would have a different unique code 15 associated therewith. The unique code 15 may consist of a plurality of bits. The number of bits is chosen to be high enough to ensure at least that in practice no two installed light encoding systems 10 in a building share the same unique code 15. Various alternative formats may be used for the unique code 15. The following are examples of possible unique codes 15 and are not intended to be limiting:

| | |
|---|---|
| 00h through 0fh: | provides 16 unique (hexadecimal) codes |
| XYh: | where X (0 through f) is a region designation and Y (0 through f) is a light source designation within each region |
| aabbcccc (binary) | where aa represents a location classification (e.g., mall, office), bb represents a floor number and cccc represents a light source designation within a particular location and on a particular floor. |

The unique code 15 may be transmitted/modulated at regular intervals, e.g., once per second, or only at specific times as needed. In the case of the regular intervals of once per second, the transmission bit-rate of the unique code 15 can be very low, for instance 200 bits/second (which is not visible to the human eye). This bit rate simplifies the design of a receiver 20 and reduces its power consumption. The transmission of data in the previous art typically requires a much higher bit-rate. Also it is generally easier to modulate the light output at a lower frequency. Alternatively, the unique code 15 may only be transmitted/modulated when prompted by an external trigger. The trigger may be an input received via the interface 16. The input may be from the receiver 20 (discussed below).

It is also noted that the light encoding system 10 does not need to receive any input data to transmit. As discussed above, the unique code 15 is predetermined/programmed for the light source 12. Therefore there is no need to tie all light sources into a network as prior art systems require. It is also noted that no regulations are imposed on light emissions or the modulation of light emissions from lighting sources.

Figure 3:
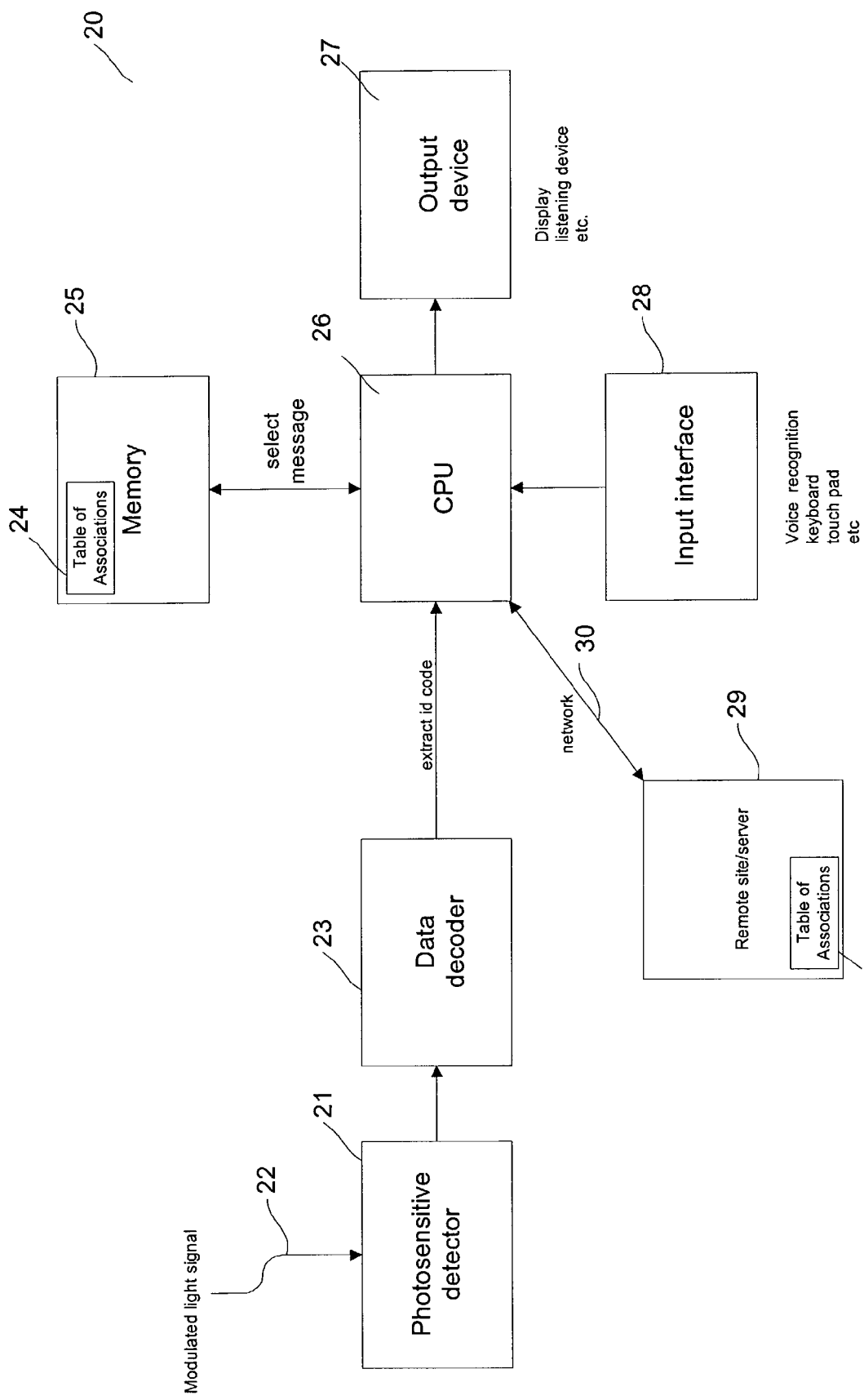
FIG. 3 is a block diagram of an optical receiver in accordance with one embodiment of the invention.

A block diagram of the receiver 20 in accordance with one embodiment is shown in FIG. 3. The receiver 20 includes a photosensitive detector 21 to detect the modulated light signal 22 and a decoder 23 to extract the unique code 15 from the modulated light signal 22. The unique code 15 is associated with a location of the light source 12 in a table of associations 24 of the building stored in a memory 25. Using the unique code 15 from one or more light sources 12 and the table of associations 24, the appropriate pre-stored message can be selected. Based upon the selection, the message can be played back or displayed via the output device 27.

One difference between the present invention from the conventional systems using light output modulation to transmit data is the use of the memory 25 to store messages instead of having to transmit a large amount of information related to a particular location. The modulated light only needs to include the unique code 15. The unique code 15 is used to retrieve the relevant information from the memory 25. The overall processing of unique code 15 and localized message is performed by a CPU 26 or controller.

The CPU 26 may also include a communication interface, a memory interface, a CD-ROM drive interface and a video interface (not shown). The CPU 26 comprises a microprocessor or the like for executing computer readable code, i.e., applications, such as those noted above, out of the memory 25. Such applications may be stored in memory 25 or, alternatively, on a floppy disk in disk drive or a CD-ROM in a CD-ROM drive. The CPU 26 accesses the applications (or other data) stored on a floppy disk via the memory interface and accesses the applications (or other data) stored on a CD-ROM via CD-ROM drive interface.

As noted above, the functions of the system 10 are implemented by computer readable code executed by a data processing apparatus. The code may be stored in a memory within the data processing apparatus or read/downloaded from a memory medium such as a CD-ROM or floppy disk. In other embodiments, however, hardware circuitry may be used in place of, or in combination with, software instructions to implement the invention. These functions/software/hardware may be formed as part of the receiver 20 or be an adjunct unit. The invention, for example, can also be implemented on a Personal Digital Assistant, laptop computer, a cellular telephone or the like.

The receiver 20 also includes an output device 27. The output device 27 may include a variety of audio and visual units. The output device may also be a separate unit coupled to the CPU 26. For example, the output device 27 may be a personal computer or a cellular phone.

The receiver 20 may also include an input unit 28. The input unit 28 may comprise a variety of conventional data input devices. For example, the input unit 28 may be a keyboard, push buttons, a touch pad, a mouse, a voice recognition unit or the like. Using the input unit 28, a user of the information retrieval system 10 can enter data such as a user preference. Using the input information, the CPU 26 will use the user preference to further filter/modify the specific messages to the user on the output device 27.

The receiver 20 may also be able to communicate to one or more of remote devices 29 over a network 30. The network 30 may be a global computer communications network such as the Internet, a wide area network, a metropolitan area network, a local area network, a cable network, a satellite network or a telephone network, as well as portions or combinations of these and other types of networks. The network 30 may be accessed by the receiver 20 through wired connections, wireless connections or combinations thereof, using well-known conventional communication protocols such as the Internet Protocol (IP).

As shown in FIG. 3, the table of associations 24 and associated localized messages may be located at the remote site 29, e.g., a web server. The remote site 29 may include a data storage device that stores any type of multimedia information related to the table of associations 24 and associated localized messages. The data storage may be any suitable storage medium such as audio/video cassettes, digital audio tapes (DAT), laser discs, DVDs, and the like.

Figure 4:
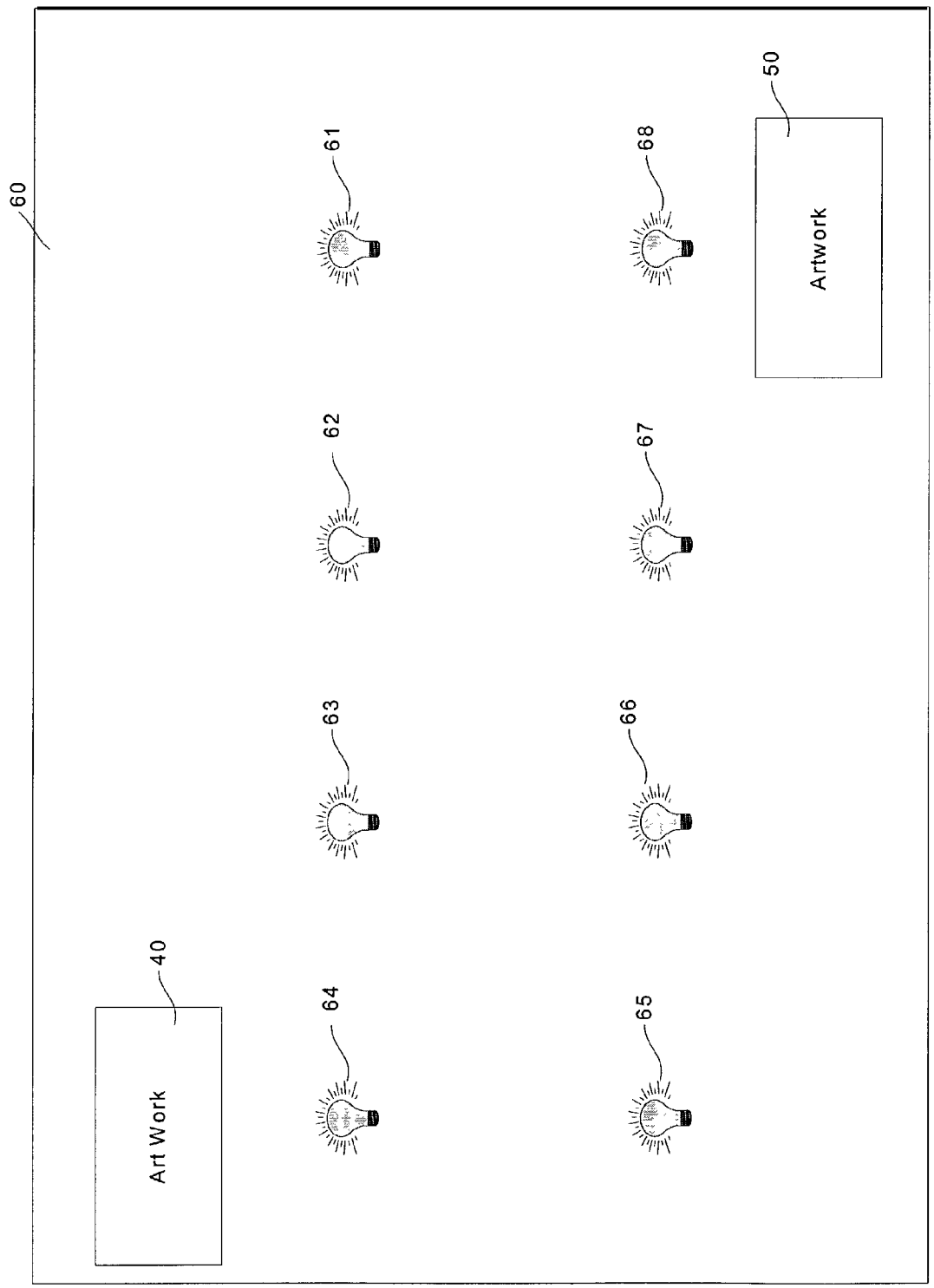
FIG. 4. is a block diagram illustrating an exemplary application of a position dependent information retrieval system in accordance with another embodiment of the invention.

FIG. 4 a block diagram illustrating an exemplary application of the information retrieval system 10. In this example, a first piece of artwork 40 and a second piece of artwork 50 are located in a museum 60. A plurality of light sources 61–68 is located throughout the museum 60. A person 70 located near light source 64 using the receiver 20 would receive a message concerning the piece of artwork 40. A person 70 located near the light source 67 would receive a message concerning the second piece of artwork 50.

While the present invention has been described above in terms of specific embodiments, it is to be understood that the invention is not intended to be confined or limited to the embodiments disclosed herein. On the contrary, the present invention is intended to cover various structures and modifications thereof included within the spirit and scope of the appended claims.

What is claimed is:

1. A position dependent information retrieval system comprising a plurality of transmitter units and at least one receiver unit, each of said plurality of transmitter units comprising:

a light source;

a driver for generating a drive signal for said light source such that said light source produces a light signal; and an encoder for modulating said drive signal with a predetermined signature such that said light source produces a modulated light signal, wherein said predetermined signature is unique for each of said plurality of transmitter units, and said at least one receiver unit comprising:

a receiver including a photosensitive detector for detecting the modulated light signal, and a decoder for decoding the predetermined signature;

a memory having stored therein a plurality of localized messages;

a controller communicatively coupled to the receiver and the memory, said controller receiving the decoded predetermined signature from said receiver, and obtaining at least one of said stored localized messages in dependence on the decoded predetermined signature; and an output device coupled to the controller for outputting the obtained at least one localized message.

2. The position dependent information retrieval system as claimed in claim 1, wherein each of the unique predetermined signatures comprises a unique binary code.

3. The position dependent information retrieval system as claimed in claim 1, wherein the position dependent information retrieval system is located within a building.

4. The position dependent information retrieval system as claimed claim 1, wherein the output device comprises an audio device or an image device.

5. The position dependent information retrieval system as claimed in claim 1, wherein the memory references a table of associations used to provide the localized message.

6. The position dependent information retrieval system as claimed in claim 5, wherein the memory is integrated with the at least one receiver unit, the controller and the output device.

7. The position dependent information retrieval system as claimed claim 1, wherein the memory is accessed by the controller via a communication network to update the localized messages stored in the memory.

8. The position dependent information retrieval system as claimed in claim 1, wherein the at least one receiver unit further comprises an input device.

9. The position dependent information retrieval system as claimed in claim 8, wherein the localized message outputted using the output device is modified based upon a plurality of user preferences entered via the input device.

10. The position dependent information retrieval system as claimed in claim 8, wherein the input device comprises a keyboard, push buttons, a touch pad, a mouse or a voice recognition unit.

11. A receiver unit comprising:

a photosensitive detector for detecting a modulated light signal;

a decoder for decoding a unique predetermined code from the modulated light signal;

a memory having stored therein a plurality of localized messages;

a controller communicatively coupled to the decoder and the memory, said controller receiving the decoded unique predetermined code from said decoder, and obtaining at least one of said stored localized messages from said memory in dependence on the decoded unique predetermined code; and an output device coupled to the controller for outputting the obtained at least one localized message.

12. The receiver unit as claimed in claim 11, wherein the memory is integrated with the controller and the output device.

13. The receiver unit as claimed in claim 11, wherein the memory is accessed by the controller via a communication network to update the localized messages stored in the memory.

14. The receiver unit as claimed in claim 11, further comprising an input device.

15. The receiver unit as claimed in claim 11, wherein the localized message outputted using the output device is modified based upon a plurality of user preferences entered via the input device.

16. The receiver unit as claimed in claim 11, wherein the memory references a table of associations used to provide the localized message.

17. A position dependent information retrieval system comprising:
- means for producing a plurality of light signals in different locations, each of said light signals having a unique signature;
- means for receiving one of said light signals and for decoding the unique signature from said one light signal;
- means for providing a localized message in accordance with the unique signature.

* * * * *